A. Fishburn,
Gate Post.
No. 86,383. Patented Feb. 2, 1869.
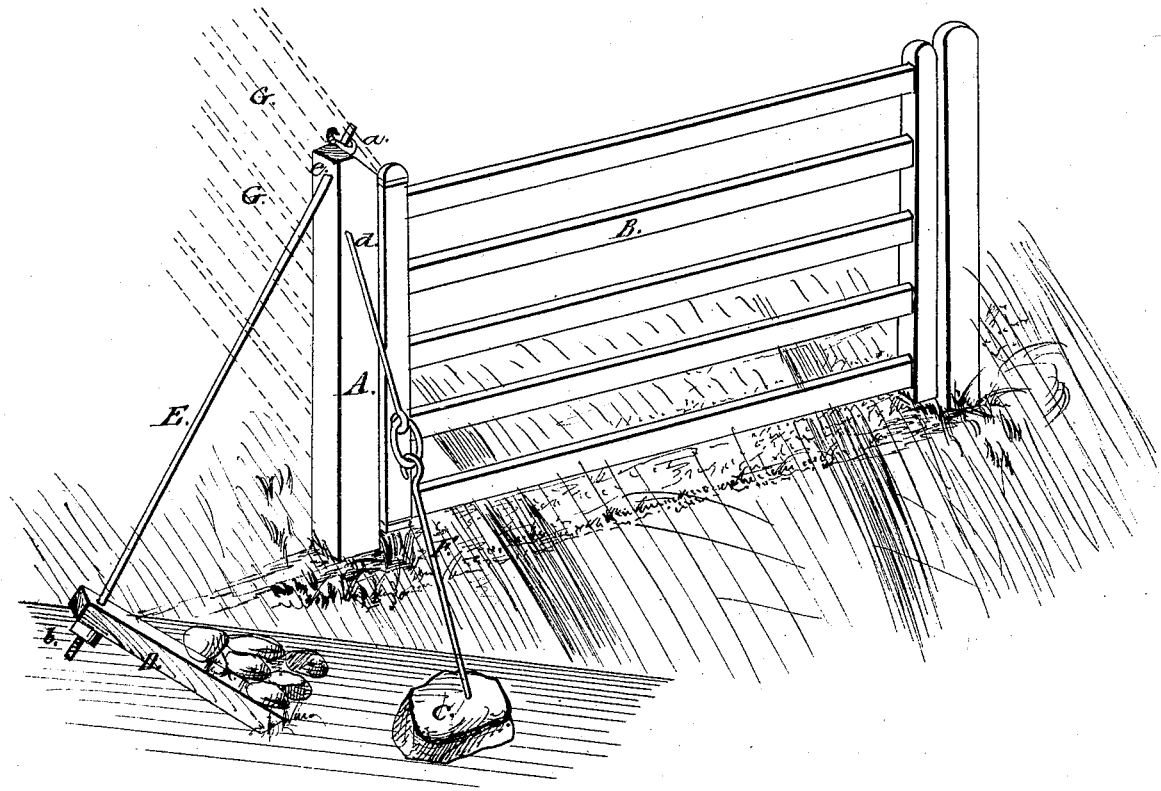
Witnesses:
C. L. Lochman
R. L. Spindler
Inventor:
Anthony Fishburn

ANTHONY FISHBURN, OF CARLISLE, PENNSYLVANIA.

Letters Patent No. 86,383, dated February 2, 1869.

IMPROVEMENT IN GATE-POSTS.

The Schedule referred to in these Letters Patent and making part of the same.

*To all whom it may concern:*

Be it known that I, ANTHONY FISHBURN, of Carlisle, in the county of Cumberland, and State of Pennsylvania, have invented a new and improved Gate-Post; and I do hereby declare that the following is a full and exact description thereof, reference being had to the accompanying drawings, and to the letters of reference marked thereon.

The nature of my invention consists in providing a gate-post with stays and anchors, to prevent the sagging of a gate hinged thereon.

I use any ordinary post, and sink it in the ground, as usual. At near the top I fasten two rods, which penetrate the post, and are secured by burrs, and, at the other ends, I fasten an anchor of wood or stone to each rod, secured in any suitable manner. These anchors are embedded in the ground, and, to make them more steady, may be loaded with stones.

By reference to the drawings, the construction is easily understood.

A is the post.

B, the gate.

E, a stay, or rod of iron, fastened at the top of the post, and running in a line with the gate, descending at an angle of thirty degrees, more or less, and is secured to the wooden anchor D.

F is a similar rod, running at right angles with the gate, and being in line with the same, when open, as shown by the dotted lines G G, and is held by the stone anchor C.

By means of these stays and anchors, a gate will retain its horizontal position very effectually, and should it deviate some, may easily be restored to its proper position by the burrs on the rods at the top of the post.

I am aware that separate anchors have before been used for retaining fence-posts in position, nor do I wish to be understood as broadly claiming the same. I am not, however, aware that separate anchors have been arranged as mine are, viz, one in line with the gate, when closed, and the other in line with its position, when open; therefore,

What I claim as my invention, and desire to secure by Letters Patent, is—

1. The use of two or more tension-rods, E and F, with their screws and nuts, to make them adjustable, in combination with a gate-post, as described.

2. The use of two or more anchors, C and D, in combination with rods, when supporting a gate-post, in the manner and for the purpose set forth.

3. The whole, combined and constructed substantially as set forth within.

ANTHONY FISHBURN.

Witnesses:
C. L. LOCHMAN,
A. L. SPONSLER.